US012335358B2

(12) United States Patent
Liu

(10) Patent No.: US 12,335,358 B2
(45) Date of Patent: Jun. 17, 2025

(54) IMAGE PROCESSING METHOD AND APPARATUS, DEVICE AND STORAGE MEDIUM

(71) Applicant: Beijing Xiaomi Mobile Software Co., Ltd., Beijing (CN)

(72) Inventor: Pan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 93 days.

(21) Appl. No.: 17/815,166

(22) Filed: Jul. 26, 2022

(65) Prior Publication Data

US 2023/0328159 A1 Oct. 12, 2023

(30) Foreign Application Priority Data

Mar. 25, 2022 (CN) .......................... 202210321866.7

(51) Int. Cl.
G06F 15/16 (2006.01)
H04L 69/00 (2022.01)
H04L 69/16 (2022.01)

(52) U.S. Cl.
CPC .............. *H04L 69/16* (2013.01); *H04L 69/02* (2013.01)

(58) Field of Classification Search
CPC ......... H04L 69/16; H04L 69/02; H04L 67/04; H04L 67/06; H04L 67/12; H04L 67/34; H04L 69/24
USPC ....................................................... 709/230
See application file for complete search history.

(56) References Cited

U.S. PATENT DOCUMENTS

| 2002/0032027 | A1* | 3/2002 | Kirani | ..................... H04L 67/04 455/566 |
| 2016/0044719 | A1* | 2/2016 | Sidhu | ..................... H04W 68/00 370/329 |
| 2016/0182803 | A1* | 6/2016 | Song | .................. H04N 1/00209 348/211.2 |
| 2019/0007949 | A1* | 1/2019 | Myers, III | ............ H04W 36/24 |
| 2019/0261168 | A1* | 8/2019 | Shi | ........................ H04W 12/35 |

FOREIGN PATENT DOCUMENTS

| CN | 105516423 A | 4/2016 |
| CN | 111782876 A | 10/2020 |
| CN | 112004076 A | 11/2020 |
| WO | 2020125604 A1 | 6/2020 |

OTHER PUBLICATIONS

IEEE Computer Society. "IEEE Standard for Information Technology—Telecommunications and Information Exchange between Systems Local and Metropolitan Area Networks—Specific Requirements," IEEE Std 802.11, LAN/MAN Standards Committee of the IEEE Computer Society, Dec. 3, 2020, 4379 pages. (Submitted in Two Parts).

* cited by examiner

Primary Examiner — Nicholas P Celani
Assistant Examiner — Karina J Garcia-Ching
(74) Attorney, Agent, or Firm — McCoy Russell LLP

(57) ABSTRACT

An image processing method includes: receiving request information used for transmitting target data and sent by the external module based on a pre-established communication connection, in which the communication connection is established based on a hardware specification of the external module; determining a transmission parameter of the target data based on the request information; and receiving the target data transmitted by the external module based on the transmission parameter.

15 Claims, 11 Drawing Sheets

IMAGE PROCESSING METHOD AND APPARATUS, DEVICE AND STORAGE MEDIUM

CROSS-REFERENCE TO RELATED APPLICATION

The present application claims priority to Chinese Patent Application No. 202210321866.7, filed on Mar. 25, 2022. The entire contents of the above-listed application are hereby incorporated by reference for all purposes.

BACKGROUND

In recent years, with development of a mobile communication technology, various terminal devices such as a mobile phone and a tablet computer have become quite important electronic devices in people's daily life and have more and more functions. A photographing function is more like one of indispensable functions of the terminal device.

SUMMARY

The present disclosure provide an image processing method and apparatus, a device and a storage medium.

According to a first aspect of examples of the present disclosure, a data processing method is provided and performed by a terminal device into which an external module is connected. The method includes:
  receiving request information used for transmitting target data and sent by the external module based on a pre-established communication connection, in which the communication connection is established based on a hardware specification of the external module;
  determining a transmission parameter of the target data based on the request information; and
  receiving the target data transmitted by the external module based on the transmission parameter.

According to a second aspect of examples of the present disclosure, a data processing method is provided and performed by an external module connected into a terminal device and includes:
  sending request information used for transmitting target data to the terminal device based on a pre-established communication connection in response to collecting the target data, in which the communication connection is established based on a hardware specification of the external module; and
  transmitting the target data to the terminal device based on a transmission parameter in response to that the terminal device determines the transmission parameter of the target data based on the request information.

According to a third aspect of examples of the present disclosure, an electronic device is provided and includes:
  a processor and a memory configured to store a computer program, in which
  the processor is configured to, when executing the computer program, implement:
  receiving request information used for transmitting target data and sent by an external module based on a pre-established communication connection, in which the communication connection is established based on a hardware specification of the external module;
  determining a transmission parameter of the target data based on the request information; and
  receiving the target data transmitted by the external module based on the transmission parameter.

According to a fourth aspect of examples of the present disclosure, a non-transitory computer-readable storage medium is provided and stores a computer program, in which the program, when executed by a processor, implements:
  receiving request information used for transmitting target data and sent by an external module based on a pre-established communication connection, in which the communication connection is established based on a hardware specification of the external module;
  determining a transmission parameter of the target data based on the request information; and
  receiving the target data transmitted by the external module based on the transmission parameter.

It should be understood that the above general description and the following detailed description are merely examples and are merely explanatory instead of limiting the present disclosure.

BRIEF DESCRIPTION OF THE DRAWINGS

Accompanying drawings here, which are incorporated in and constitute a part of the specification, illustrate examples consistent with the present disclosure and, together with the specification, serve to explain principles of the present disclosure.

DETAILED DESCRIPTION

Examples will be described in detail here and shown in the accompanying drawings. When the following description involves the accompanying drawings, unless otherwise stated, the same number in different accompanying drawings represents the same or similar elements. The described examples in the following examples do not represent all examples consistent with the present disclosure. Rather, they are just examples of an apparatus and method consistent with some aspects of the present disclosure.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The present disclosure relates to the technical field of mobile communication, in particular to an image processing method and apparatus, a device and a storage medium. It should be understood that the image processing method provided in the embodiment of the present disclosure can also be referred to as a data processing method.

In recent years, with development of a mobile communication technology, various terminal devices such as a mobile phone and a tablet computer have become quite important electronic devices in people's daily life and have more and more functions. A photographing function is more like one of indispensable functions of the terminal device. At present, in the field of a wireless plug-in camera, some manufacturers use a Bluetooth protocol as a communication standard. However, the wireless plug-in camera, limited by a transmission bandwidth of the Bluetooth protocol, can transmit nothing but an image code stream subjected to compressed encoding to the terminal device, that is, possibility of wireless transmission is guaranteed by reducing a code stream, which cannot meet a demand of a terminal user for obtaining a high-definition image and preforming subsequent processing, and selection of a solution for connecting the wireless plug-in camera into the terminal device is limited, for example, there is no choice but a wireless plug-in camera with an image compressed encoding function to be connected into.

Figure 1:
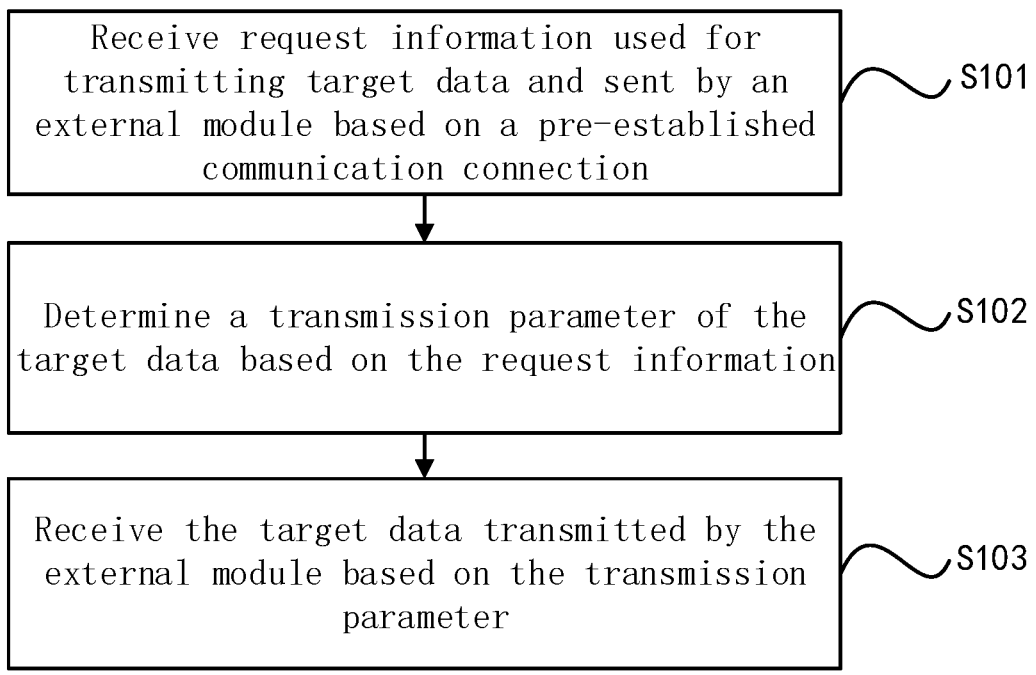
FIG. 1 is a flowchart of an image processing method shown according to an example of the present disclosure.

FIG. 1 is a flowchart of an image processing method shown according to an example. The method of the example may be applied to a terminal device (such as a smartphone, a tablet computer, a desktop computer and a wearable device) into which a camera module is connected.

As shown in FIG. 1, the method includes the following steps S101 to S103.

In step S101, request information used for transmitting target data and sent by an external module is received based on a pre-established communication connection.

In step S102, a transmission parameter of the target data is determined based on the request information.

In step S103, the target data transmitted by the external module is received based on the transmission parameter.

In the example, when the external module (such as the camera module) connected into the terminal device needs to transmit the target data to the terminal device, the request information used for transmitting the target data may be sent to the terminal device based on the pre-established communication connection, the communication connection is established based on a hardware specification of the external module, so the terminal device can determine a transmission parameter of the target data based on the request information after receiving the request information, and then can receive the target data transmitted by the external module based on the transmission parameter.

The above communication connection includes a TCP/IP protocol communication connection. It can be understood that a connection stage of the external module and the terminal device adopts a TCP/IP protocol communication connection, compared with a Bluetooth protocol in a traditional solution, a larger transmission bandwidth (according to recordings in the related art, a transmission bandwidth of the Bluetooth protocol may be as largest as 1 Mbps, and a transmission bandwidth of the TCP/IP protocol may reach as largest as hundreds of Mbps) may be provided, and connection reliability can be guaranteed.

The above request information may include at least one type among an image sensor manufacturer, a data type classification, an image resolution, a frame rate, an image format or camera information.

For example, the above target data may include a target image and the like. Correspondingly, the transmission parameter of the above target data may include at least one type among an image resolution, the quantity of transmission channels or a frame rate of the target image.

For example, the above target image may include a non-processed image collected by the camera module, or an image collected and processed by the camera module. A type of the target image may be set based on actual demands, for example, at least one type among an RGB Raw image, a Raw image collected by a TOF camera, an RGB image collected by double cameras, an RGB/YUV image, an image compressed code stream or the like is set. In the related art, a tricolor camera or a color CCD camera is usually used for photographing, then a photographed color image signal is subjected to color separation, amplification and calibration so as to obtain an RGB, then a brightness signal Y and two color difference signals R-Y (namely, U) and B-Y (namely, V) are obtained through a matrix transformation circuit, finally, a sending end encodes three signals of brightness and color difference respectively and send the three signals through the same channel, and this color representation method is so-called YUV color space representation. That is, in the example, the camera module may transmit an obtained non-processed original image (such as an RGB Raw image) to the terminal device; or may transmit an RGB or YUV image obtained after processing the RGB Raw image through an ISP module and other modules to the terminal device; or may also transmit an image compressed code stream obtained after compressing of the original image to the terminal device. Besides, a camera module with double cameras can transmit a double-camera RGB image to the terminal device. A camera module with a TOF camera can transmit a TOF Raw image to the terminal device.

It can be known from the above description that in the example, by receiving the request information used for transmitting the target data and sent by the external module based on the pre-established communication connection, determining the transmission parameter of the target data based on the request information, and then receiving the target data transmitted by the external module based on the transmission parameter, as the communication connection is established based on the hardware specification of the external module, channels of connecting camera modules of different specifications into the terminal device can be broadened, selection of a solution for connecting the camera module into the terminal device is broken through, besides, as the transmission parameter of the target data is determined based on the request information sent by the external module, better transmitting the target data can be realized, and thus the demand of a user for obtaining high-quality target data is met.

Figure 2:
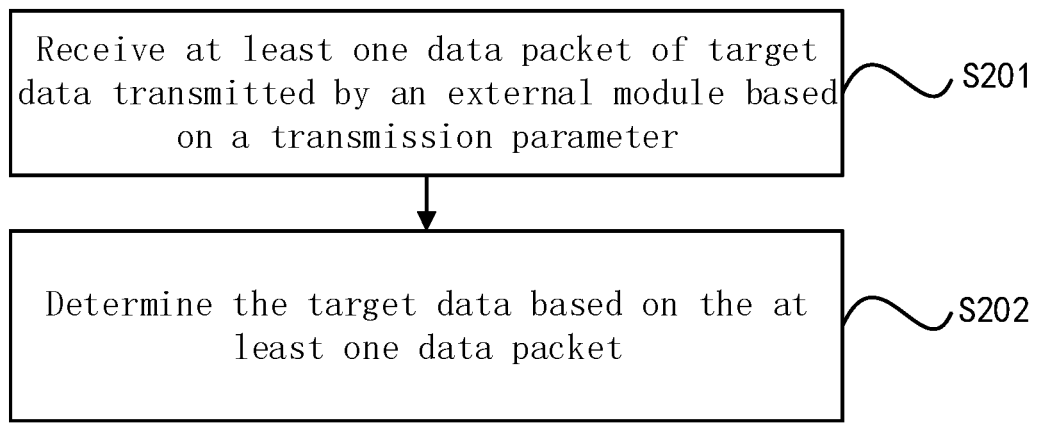
FIG. 2 is a flowchart of how to receive target data transmitted by an external module based on a transmission parameter shown according to an example of the present disclosure.

FIG. 2 is a flowchart of how to receive target data transmitted by an external module based on a transmission parameter shown according to an example of the present disclosure. The example makes description by taking how to receive the target data transmitted by the external module based on the transmission parameter as an example on the basis of the above example. As shown in FIG. 2, receiving the target data transmitted by the external module based on the transmission parameter in the above step S103 may include the following steps S201 to S202.

In step S201, at least one data packet of the target data transmitted by the external module is received based on the transmission parameter.

In step S202, the target data are determined based on the at least one data packet.

In the example, after the transmission parameter of the target data is determined based on the request information used for transmitting the target data and sent by the external module, at least one data packet of the target data transmitted by the external module may be received based on the transmission parameter, and then the target data are determined based on the at least one data packet.

Taking the target data being the target image as an example, the transmission parameter of the target data may be at least one type among an image resolution, the quantity of transmission channels or a frame rate. For example, before the terminal device receives the target data transmitted by the external module, the terminal device may firstly consult with the external module about the transmission parameter of the target data. For example, transmission parameters such as the image resolution, the quantity of channels and frame rate information may be determined based on the request information sent by the external module. In the example, each image may be transmitted according to a data packet format. For example, each data packet may include a packet header, a packet tail, a data effective load and a check bit, and the packet header includes at least one item of a frame number or a row number of a pixel in an image.

It can be known from the above description that in the example, by receiving the at least one data packet of the target data transmitted by the external module based on the transmission parameter, the target data are determined based on the at least one data packet, receiving of the target data transmitted by the external module based on the transmission parameter can be realized, then it can be realized that the target data are subsequently transmitted to a bottom-layer processing module to be processed, transmitting a high-definition image to the terminal device by the external module can be realized, and thus the demand of a terminal user for obtaining the high-definition image and performing subsequent processing can be met.

Figure 3:
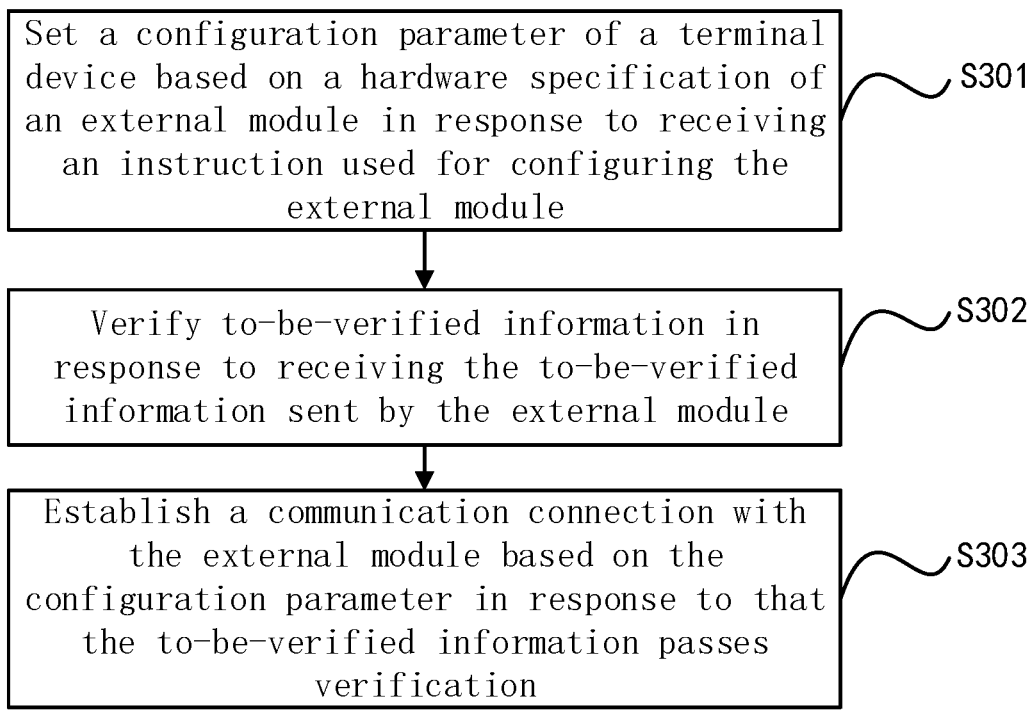
FIG. 3 is a flowchart of how to establish a communication connection shown according to an example of the present disclosure.

FIG. 3 is a flowchart of how to establish a communication connection shown according to an example of the present disclosure. The example makes description by taking how to establish the communication connection between the external module and the terminal device as an example on the basis of the above example. As shown in FIG. 3, the image processing method of the example may also include the communication connection is established based on the following steps S301 to S303.

In step S301, a configuration parameter of the terminal device is set based on the hardware specification of the external module in response to receiving an instruction used for configuring the external module.

In step S302, to-be-verified information is verified in response to receiving the to-be-verified information sent by the external module.

In step S303, the communication connection with the external module is established based on the configuration parameter in response to that the to-be-verified information passes verification.

The above configuration parameter may include at least one type among a hardware interface type, a transmission protocol or an algorithm processing module. For example, the hardware interface type may include an interface supporting an IEEE 802.11 standard protocol, and the IEEE 802.11.A standard protocol includes a 802.11.AC standard protocol, a 802.11.AX standard protocol, a 802.11.AD standard protocol and a 802.11.AY standard protocol, etc., which can improve a communication bandwidth. The above transmission protocol may include a TCP/IP protocol and the like. The algorithm processing module may include at least one type among an image signal processing (ISP) module, an artificial intelligence (AI) module, a compressed coding and decoding module, a deep computing module or a double-camera RGB processing module.

For example, after the terminal device receives the instruction used for configuring the external module, the configuration parameter, for example, the hardware interface type, the transmission protocol and the algorithm processing module, of the terminal device may be set based on the hardware specification of the external module, a network hot spot of a terminal device side may be opened so that the external module is to be connected into the terminal device, and when the external module is connected into the terminal device, the to-be-verified information may be sent to the terminal device. The to-be-verified information may include a password for connecting into the network hot spot set on the terminal device, which is not limited by the example. Based on this, after the terminal device receives the to-be-verified information sent by the external module, the terminal device may verify the to-be-verified information, for example, the to-be-verified information is compared with correct verification information pre-stored in the terminal device, if the to-be-verified information is the same as the correct verification information, the to-be-verified information may pass the verification, and thus the communication connection may be established with the external module based on the above configuration parameter.

It can be known from the above description that in the example, by setting the configuration parameter of the terminal device based on the hardware specification of the external module in response to receiving the instruction used for configuring the external module, verifying to-be-verified information in response to receiving the to-be-verified information sent by the external module, and then establishing the communication connection with the external module based on the configuration parameter in response to that the to-be-verified information passes the verification, safely and fast establishing the communication connection between the terminal device and the external module may be realized, and thus subsequent information interaction between the external module and the terminal device based on the communication connection may be realized.

Figure 4:
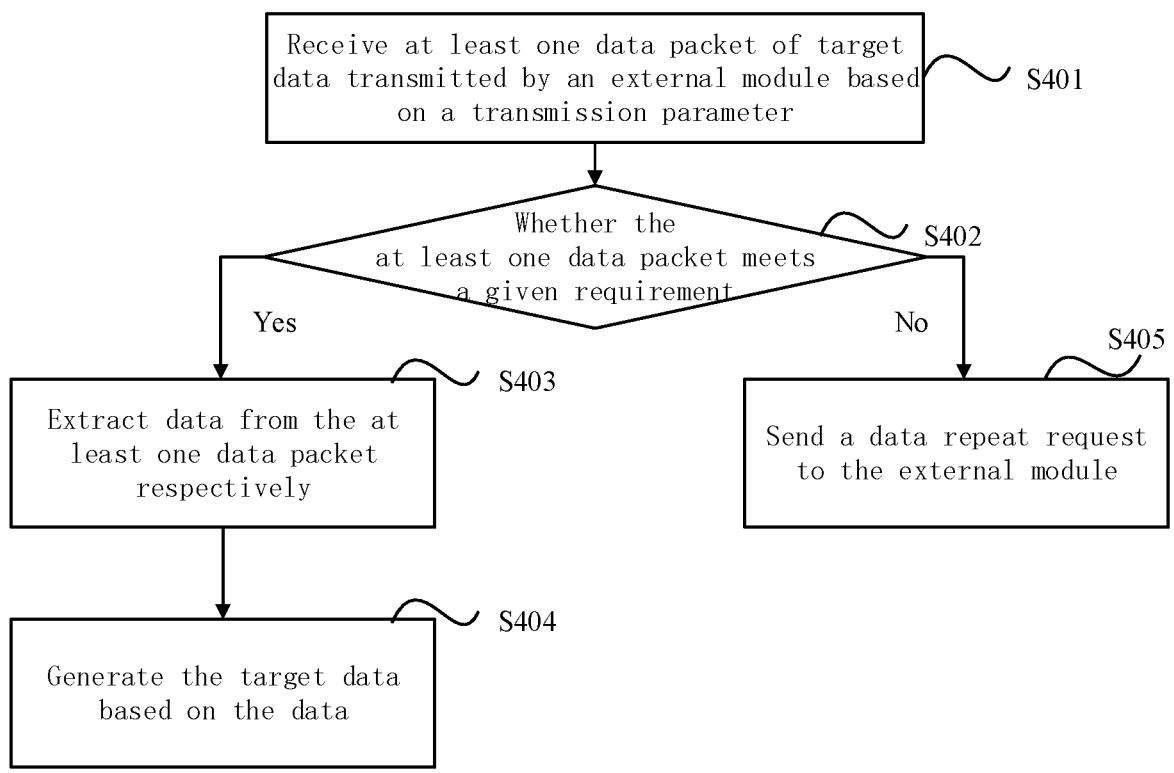
FIG. 4 is a flowchart of how to receive target data transmitted by an external module based on a transmission parameter shown according to an example of the present disclosure.

FIG. 4 is a flowchart of how to receive target data transmitted by an external module based on a transmission parameter shown according to an example of the present disclosure. The example makes description by taking how to receive the target data transmitted by the external module based on the transmission parameter as an example on the basis of the above example. As shown in FIG. 4, receiving the target data transmitted by the external module based on the transmission parameter in the above step S103 may include the following steps S401 to S405.

In step S401, at least one data packet of the target data transmitted by the external module is received based on the transmission parameter.

In step S402, whether the at least one data packet meets a given requirement is determined, if yes, step S403 is executed; and if not, step S405 is executed.

In step S403, data are extracted from the at least one data packet respectively. In step S404, the target data are generated based on the data.

In step S405, an image repeat request is sent to the external module.

Relevant explanation and description in step S401 may refer to the example shown in FIG. 2 and will not be described in detail here.

For example, after the at least one data packet of the target data transmitted by the external module is received based on the transmission parameter, whether the at least one obtained data packet meets the given requirement may be determined, so the data may be extracted from the at least one data packet respectively when it is determined that the at least one data packet meets the given requirement, the target data are generated based on the data, for example, the target data are spliced based on the data in the at least one data packet, but it is determined that the at least one data packet does not meet the given requirement, the image repeat request may be sent to the external module so as to request the external module to resend the target data.

In an example, the above detecting that at least one data packet meets the given requirement may include at least one of:
determining that there is no loss of data of the at least one data packet, for example, there is no data error;
determining that there is no damage to the data of the at least one data packet, for example, there is no data missing.

For example, each data packet may include a packet header, a packet tail, a data effective load and a check bit, and the packet header includes at least one item of a frame number or a row number of a pixel in an image. Based on this, after the terminal device receives data of the complete packet, complete target data may be recovered. If data error or data missing is discovered after verification, a data repeat mechanism may be started, so as to guarantee integrity of the data.

It can be known from the above description that in the example, by receiving the at least one data packet of the target data transmitted by the external module based on the transmission parameter, whether the at least one data packet meets the given requirement is determined, when the at least one data packet meets the given requirement, the data are extracted from the at least one data packet respectively, the target data are generated based on the data, when the at least one data packet does not meet the given requirement, the image repeat request is sent to the external module, transmitting the high-definition image to the terminal device by the external module can be realized, and thus the demand of the terminal user for obtaining the high-definition image and performing subsequent processing can be met.

Figure 5:
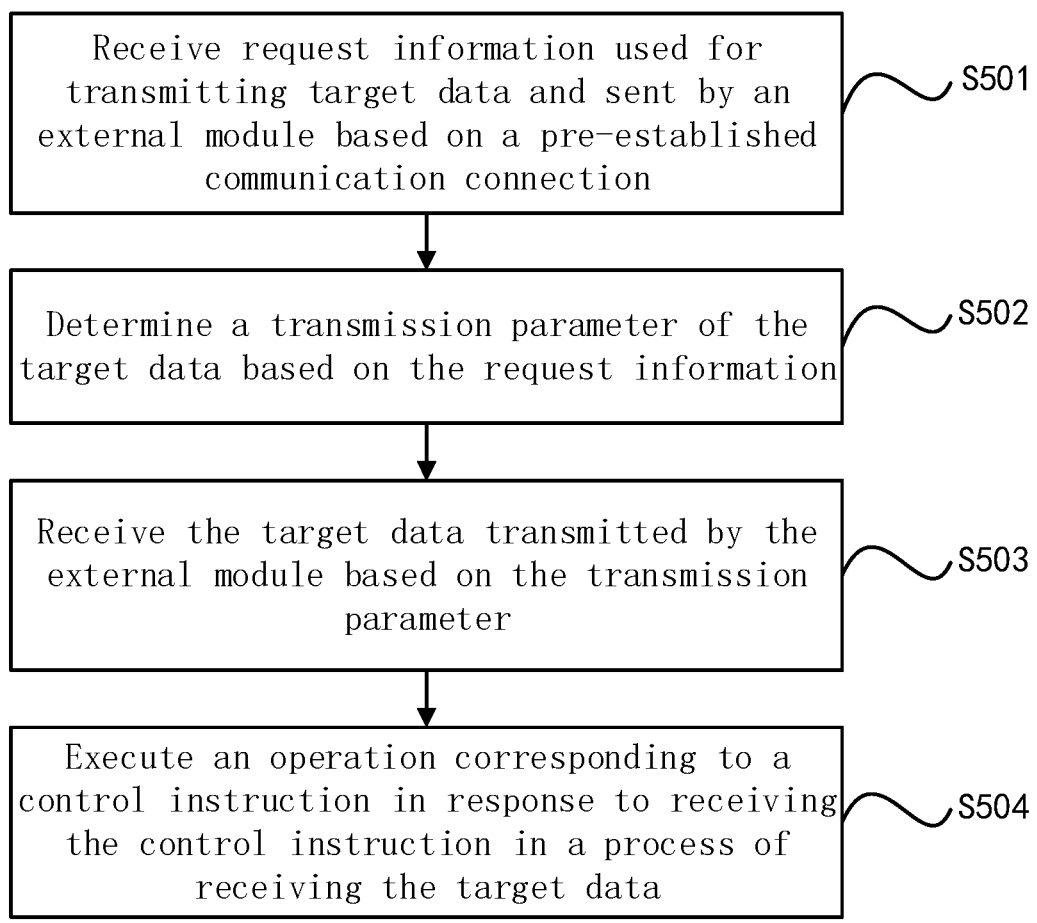
FIG. 5 is a flowchart of another image processing method shown according to an example of the present disclosure.

FIG. 5 is a flowchart of another image processing method shown according to an example of the present disclosure. The method of the example may be applied to the terminal device (such as the smartphone, the tablet computer, the desktop computer and the wearable device) into which the camera module is connected.

As shown in FIG. 5, the method includes the following steps S501 to S504.

In step S501, the request information used for transmitting the target data and sent by the external module is received based on the pre-established communication connection, in which the communication connection is established based on the hardware specification of the external module.

In step S502, the transmission parameter of the target data is determined based on the request information.

In step S503, the target data transmitted by the external module are received based on the transmission parameter.

Relevant explanation and description of steps S501 to S503 may refer to steps S101 to S103 in the example in FIG. 1 and will not be described in detail here.

In step S504, an operation corresponding to a control instruction is executed in response to receiving the control instruction in a process of receiving the target data.

The operation includes at least one of:
interrupting transmission of the target data, pausing transmission of the target data or ending transmission of the target data.

In the example, the bottom-layer processing module may be further subdivided into two data streams, namely, a data path and a control path, to be managed respectively. The data path can realize high-bandwidth data real-time transmission to the bottom-layer processing module, and the control path can realize real-time control of the bottom-layer processing module over the connected external module. For example, the control path may be pre-defined as a register space access configuration mode of the plug-in external module, real-time control of the terminal device over the external module is realized, for example, operations such as interrupting, pausing or ending image transmission. It can be understood that different register configuration parameter information is usually built in external modules of different types, so access modes of all supported camera types may be covered in definition of the control path, which is not limited by the example.

It can be known from the above description that in the example, by executing the operation corresponding to the control instruction in response to receiving the control instruction in the process of receiving the target data, controllability of a data transmission process can be improved, so use experience of a user can be improved.

In an example, when the external module includes the camera module and the target data include the target image, the method of the example may further include:
S0: the received target image is transmitted to the bottom-layer processing module to be processed based on a given transmission protocol, in which the given transmission protocol includes a User Datagram Protocol (UDP) transmission protocol or a Transmission Control Protocol (TCP) protocol.

It can be understood that both the UDP transmission protocol and the TCP protocol can provide larger effective bandwidth than the Bluetooth protocol, so as to realize transmission of the high-definition image.

It is worth noting that the above bottom-layer processing module may be set based on actual demands, for example, set as at least one among the image signal processing (ISP) module, the artificial intelligence (AI) module, the compressed coding and decoding module, the deep computing module and the double-camera RGB processing module, which is not limited by the example.

Furthermore, after the target image is transmitted to the bottom-layer processing module to be processed, the terminal device may also display and/or save a processed target image, which is not limited by the example.

Figure 6:
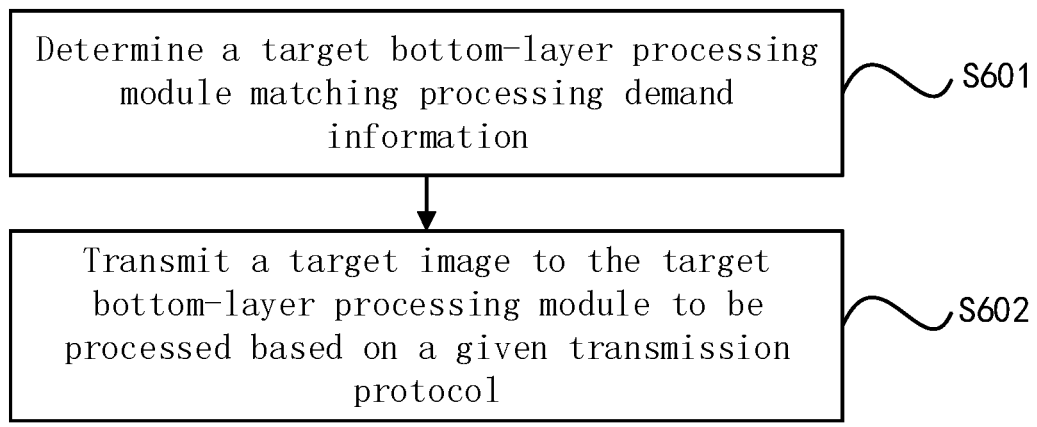
FIG. 6 is a flowchart of how to transmit a received target image to a bottom-layer processing module to be processed based on a given transmission protocol shown according to an example of the present disclosure.

For example, FIG. 6 is a flowchart of how to transmit a received target image to a bottom-layer processing module to be processed based on a given transmission protocol shown according to an example of the present disclosure. The example makes description by taking how to transmit the received target image to the bottom-layer processing module to be processed based on the given transmission protocol as an example on the basis of the above example. In the example, the request information used for processing the target image and sent by the above camera module to the terminal device may further include processing demand information of the target image. Based on this, the above step S0 may include the following steps S601 to S602.

In step S601, a target bottom-layer processing module matching the processing demand information is determined.

In step S602, the target image is transmitted to the target bottom-layer processing module to be processed based on the given transmission protocol.

For example, matching relations between various processing demand information and different bottom-layer processing modules of the terminal device may be pre-established, so after the processing demand information of the target image is determined based on the request information sent by the camera module, the target bottom-layer processing module matching the processing demand information can be determined based on the above matching relation.

For example, the above processing demand information may include at least one type among image signal processing, deep computing, binocular vision computing, compressed coding and decoding, artificial intelligence application processing or the like. Thus, the bottom-layer processing module matching the above image signal processing demand may be the image signal processing (ISP) module; the bottom-layer processing module matching the above deep computing demand may be the deep computing module; the bottom-layer processing module matching the above binocular vision computing demand may be the double-camera RGB processing module; the bottom-layer processing module matching the above compressed coding and decoding demand may be the compressed coding and decoding module; and the bottom-layer processing module matching the above artificial intelligence application processing demand may be the artificial intelligence (AI) module, etc.

In an example, each of the above bottom-layer processing modules may also contain a series of sub-modules, for example, the ISP module may include black level correction and lens distortion correction, etc., so a register space corresponding to each algorithm sub-module may be clearly pre-defined in the example, so that the subsequent bottom-layer modules can obtain corresponding register parameter information.

It can be known from the above description that in the example, by determining the target bottom-layer processing module matching the processing demand information, and transmitting the target image to the target bottom-layer processing module to be processed based on the given transmission protocol, accurately transmitting the received target image to the bottom-layer processing module to be processed based on the given transmission protocol can be realized, improving the processing quality of the target image based on powerful computing capacity of a mobile platform of the terminal device can be realized, and thus the demand of the user is met.

Figure 7:
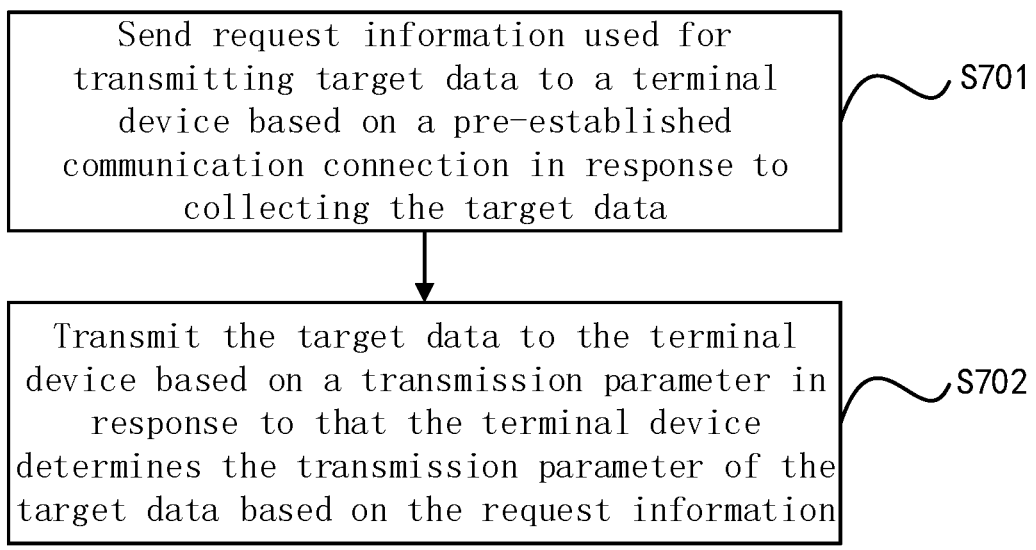
FIG. 7 is a flowchart of an image processing method shown according to an example of the present disclosure.

FIG. 7 is a flowchart of an image processing method shown according to an example of the present disclosure. The method of the example may be applied to the external module (such as a wireless camera module) connected into the terminal device. As shown in FIG. 7, the method includes the following steps S701 to S702.

In step S701, request information used for transmitting target data is sent to the terminal device based on a pre-established communication connection in response to collecting the target data.

In step S702, the target data are transmitted to the terminal device based on a transmission parameter in response to that the terminal device determines the transmission parameter of the target data based on the request information.

In the example, when the external module (such as a camera module) connected into the terminal device needs to transmit the target data to the terminal device, the request information used for transmitting the target data may be sent to the terminal device based on the pre-established communication connection, the communication connection is established based on a hardware specification of the external module, so the terminal device can determine the transmission parameter of the target data based on the request information after receiving the request information, and then can receive the target data transmitted by the external module based on the transmission parameter.

The above communication connection includes a TCP/IP protocol communication connection. It can be understood that a connection stage of the external module and the terminal device adopts the TCP/IP protocol communication connection, compared with a Bluetooth protocol in a traditional solution, a larger transmission bandwidth (according to recordings in the related art, a transmission bandwidth of the Bluetooth protocol may be as largest as 1 Mbps, and a transmission bandwidth of the TCP/IP protocol may reach as largest as hundreds of Mbps) may be provided, and connection reliability can be guaranteed.

The above request information may include at least one type among an image sensor manufacturer, a data type classification, an image resolution, a frame rate, an image format or camera information.

For example, the above target data may include the target image and the like. Correspondingly, the transmission parameter of the above target data may include at least one type among an image resolution, the quantity of transmission channels or a frame rate of the target image.

For example, the above target image may include a non-processed image collected by the camera module, or an image collected and processed by the camera module. A type of the target image may be set based on actual demands, for example, at least one type among an RGB Raw image, a Raw image collected by a TOF camera, an RGB image collected by double cameras, an RGB/YUV image, an image compressed code stream or the like is set. In the related art, a tricolor camera or a color CCD camera is usually used for photographing, then a photographed color image signal is subjected to color separation, amplification and calibration so as to obtain an RGB, then a brightness signal Y and two color difference signals R-Y (namely, U) and B-Y (namely, V) are obtained through a matrix transformation circuit, finally, a sending end encodes the three signals of brightness and color difference respectively and send the three signals through the same channel, and this color representation method is so-called YUV color space representation. That is, in the example, the camera module may transmit an obtained non-processed original image (such as an RGB Raw image) to the terminal device; or may transmit an RGB or YUV image obtained after processing the RGB Raw image through an ISP module and other modules to the terminal device; or may also transmit an image compressed code stream obtained after compressing of the original image to the terminal device. Besides, a camera module with double cameras can transmit a double-camera RGB image to the terminal device. A camera module with a TOF camera can transmit a TOF Raw image to the terminal device.

It can be known from the above description that through the method of the example, by sending the request information used for transmitting the target data to the terminal device based on the pre-established communication connection in response to collecting the target data, and transmitting the target data to the terminal device based on the transmission parameter in response to that the terminal device determines the transmission parameter of the target data based on the request information, as the communication connection is established based on the hardware specification of the external module, channels of connecting camera modules of different specifications into the terminal device can be broadened, selection of a solution for connecting the camera module into the terminal device is broken through, besides, as the transmission parameter of the target data is determined based on the request information sent by the external module, better transmitting the target data can be realized, and thus the demand of a user for obtaining high-quality target data is met.

Figure 8:
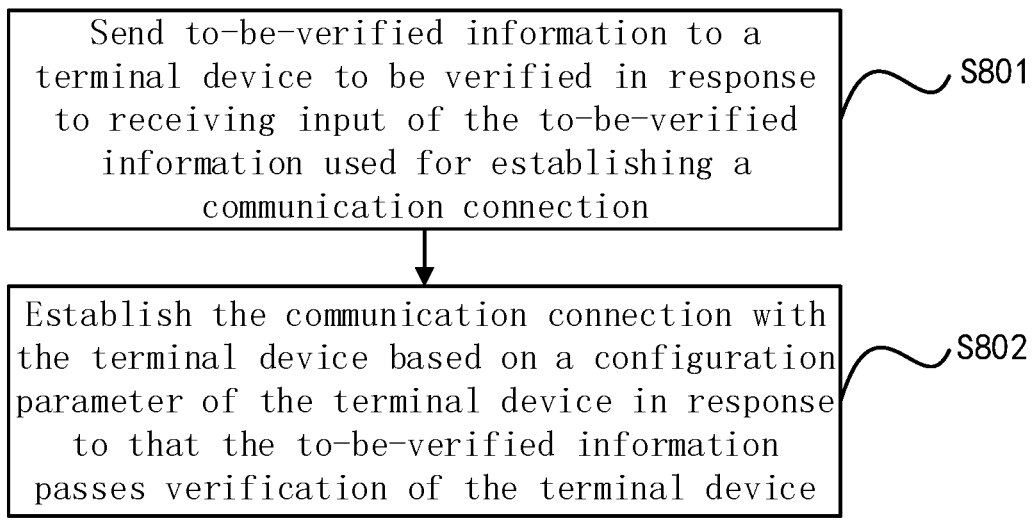
FIG. 8 is a flowchart of how to establish a communication connection shown according to an example of the present disclosure.

FIG. 8 is a flowchart of how to establish a communication connection shown according to an example of the present disclosure. The example makes description by taking how to establish the communication connection between the external module and the terminal device as an example on the basis of the above example. As shown in FIG. 8, the image processing method of the example further includes the communication connection is established based on the following steps S801 to S802.

In step S801, to-be-verified information is sent to the terminal device to be verified in response to receiving input of the to-be-verified information used for establishing the communication connection.

In step S802, the communication connection with the terminal device is established based on a configuration parameter of the terminal device in response to that the to-be-verified information passes verification of the terminal device. The configuration parameter of the terminal device is set based on the hardware specification of the external module.

The above configuration parameter may include at least one type among a hardware interface type, a transmission protocol or an algorithm processing module. For example, the hardware interface type may include an interface supporting an IEEE 802.11 standard protocol, and the IEEE 802.11.A standard protocol includes a 802.11.AC standard protocol, a 802.11.AX standard protocol, a 802.11.AD standard protocol and a 802.11.AY standard protocol, etc., which can improve a communication bandwidth. The above transmission protocol may include a TCP/IP protocol and the like. The algorithm processing module may include at least one type among an image signal processing (ISP) module, an artificial intelligence (AI) module, a compressed coding and decoding module, a deep computing module or a double-camera RGB processing module.

For example, after the terminal device receives an instruction used for configuring the external module, the configuration parameter, for example, the hardware interface type, the transmission protocol and the algorithm processing module, of the terminal device may be set based on the hardware specification of the external module, a network hot spot of a terminal device side may be opened so that the external module is to be connected into the terminal device, and when the external module is connected into the terminal device, the to-be-verified information may be sent to the terminal device. The to-be-verified information may include a password for connecting into the network hot spot set on the terminal device, which is not limited by the example. Based on this, after the terminal device receives the to-be-verified information sent by the external module, the terminal device may verify the to-be-verified information, for example, the to-be-verified information is compared with correct verification information pre-stored in the terminal device, if the to-be-verified information is the same as the correct verification information, the to-be-verified information may pass the verification, and thus the external module may establish the communication connection with the terminal device based on the configuration parameter of the terminal device.

It can be known from the above description that in the example, by sending the to-be-verified information to the terminal device to be verified in response to receiving input of the to-be-verified information used for establishing the communication connection, and establishing the communication connection with the terminal device based on the configuration parameter of the terminal device in response to that the to-be-verified information passes verification of the terminal device, the configuration parameter of the terminal device is set based on the hardware specification of the external module, safely and fast establishing the communication connection between the terminal device and the external module may be realized, and thus subsequent information interaction between the external module and the terminal device based on the communication connection may be realized.

Figure 9:
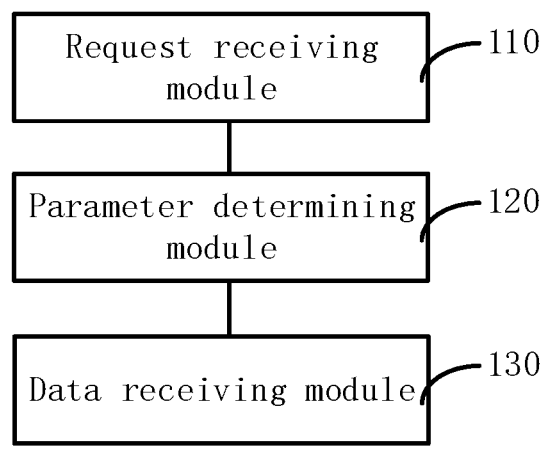
FIG. 9 is a block diagram of an image processing apparatus shown according to an example of the present disclosure.

FIG. 9 is a block diagram of an image processing apparatus shown according to an example of the present disclosure. The apparatus of the example may be applied to a terminal device (such as a smartphone, a tablet computer, a desktop computer and a wearable device) into which a camera module is connected. As shown in FIG. 9, the apparatus may include: a request receiving module 110, a parameter determining module 120 and a data receiving module 130.

The request receiving module 110 is configured to receive request information used for transmitting target data and sent by an external module based on a pre-established communication connection, in which the communication connection is established based on a hardware specification of the external module.

The parameter determining module 120 is configured to determine a transmission parameter of the target data based on the request information.

The data receiving module 130 is configured to receive the target data transmitted by the external module based on the transmission parameter.

It can be known from the above description that through the apparatus of the example, by receiving the request information used for transmitting the target data and sent by the external module based on the pre-established communication connection, determining the transmission parameter of the target data based on the request information, and then receiving the target data transmitted by the external module based on the transmission parameter, as the communication connection is established based on the hardware specification of the external module, channels of connecting camera modules of different specifications into the terminal device can be broadened, selection of a solution for connecting the camera module into the terminal device is broken through, besides, as the transmission parameter of the target data is determined based on the request information sent by the external module, better transmitting the target data can be realized, and thus the demand of a user for obtaining high-quality target data is met.

Figure 10:
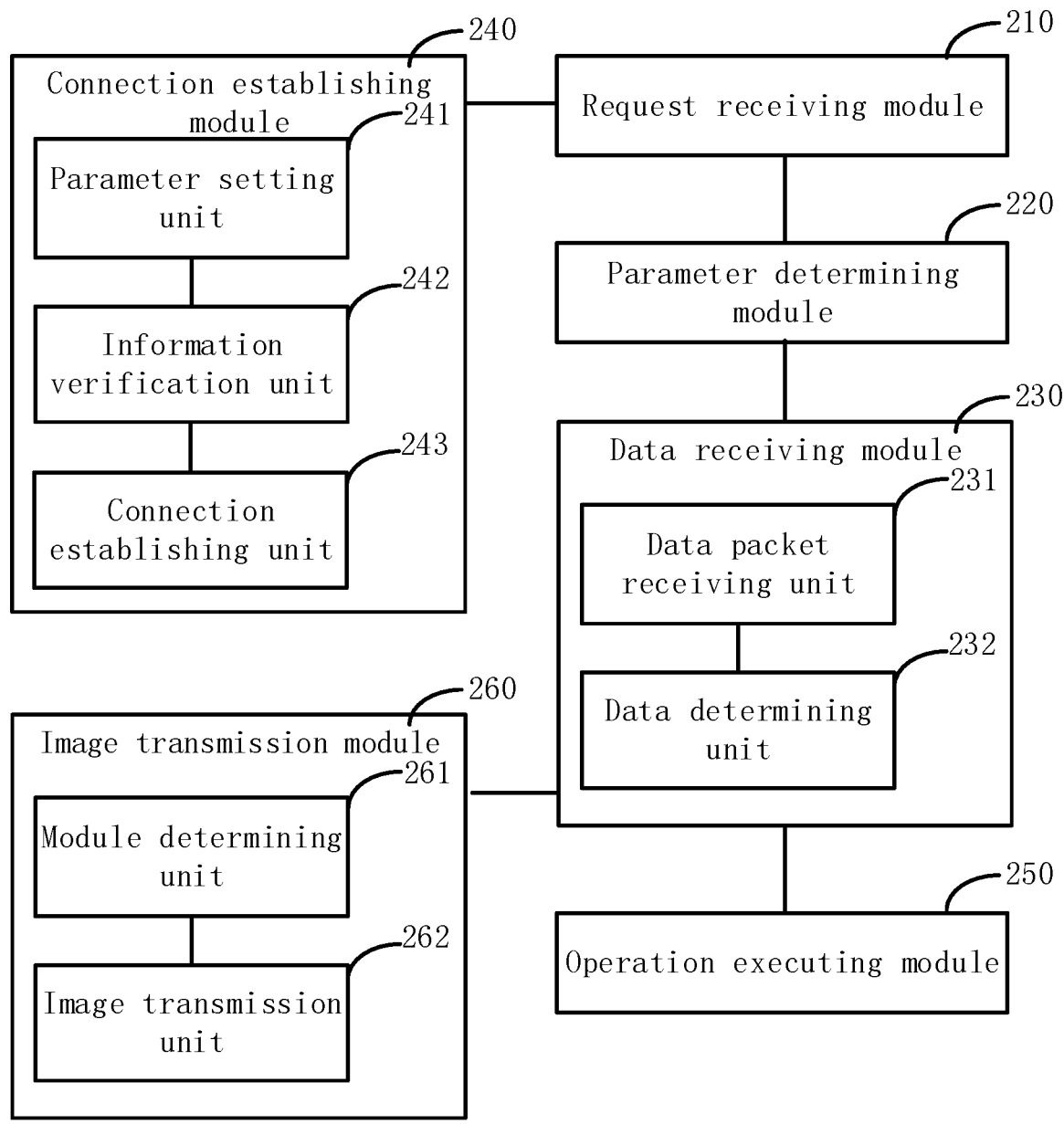
FIG. 10 is a block diagram of another image processing apparatus shown according to an example of the present disclosure.

FIG. 10 is a block diagram of another image processing apparatus shown according to an example of the present disclosure. The apparatus of the example may be applied to the terminal device (such as the smartphone, the tablet computer, the desktop computer and the wearable device) into which the camera module is connected. The request receiving module 210, the parameter determining module 220 and the data receiving module 230 are the same as functions of the request receiving module 110, the parameter determining module 120 and the data receiving module 130 of the above example shown in FIG. 9, which will not be described in detail here. As shown in FIG. 10, the data receiving module 230 may include:

a data packet receiving unit 231, configured to receive at least one data packet of the target data transmitted by the external module based on the transmission parameter; and a data determining unit 232, configured to determine the target data based on the at least one data packet.

In an example, the above apparatus may further include a connection establishing module 240.

The connection establishing module 240 may include:

a parameter setting unit 241, configured to set a configuration parameter of the terminal device based on the hardware specification of the external module in response to receiving an instruction used for configuring the external module;

an information verification unit 242, configured to verify to-be-verified information in response to receiving the to-be-verified information sent by the external module; and a connection establishing unit 243, configured to establish the communication connection with the external module based on the configuration parameter in response to that the to-be-verified information passes verification.

In an example, the above data determining unit 232 may be further configured to:

extract data from the at least one data packet respectively in response to detecting that the at least one data packet meets a given requirement; and generate the target data based on the data.

In an example, the above at least one data packet meeting the given requirement may include at least one of:

there is no loss of data of the at least one data packet;

there is no damage to the data of the at least one data packet.

In an example, the above data determining unit 232 may be further configured to:

send a data repeat request to the external module in response to detecting that the at least one data packet does not meet the given requirement, in which the data repeat request is used for requesting the external module to resend the target data.

In an example, the above apparatus may further include:

an operation executing module 250, configured to execute an operation corresponding to a control instruction in response to receiving the control instruction in a process of receiving the target data, in which the operation includes at least one of:

interrupting transmission of the target data, pausing transmission of the target data or ending transmission of the target data.

In an example, the above external module may include a camera module, and the target data may include a target image.

In an example, the above apparatus may further include:

an image transmission module 260, configured to transmit the received target image to a bottom-layer processing module to be processed based on a given transmission protocol, in which the given transmission protocol includes a UDP transmission protocol or a TCP protocol.

In an example, the above request information may further include processing demand information of the target image.

The image transmission module 260 may include:

a module determining unit 261, configured to determine a target bottom-layer processing module matching the processing demand information; and an image transmission unit 262, configured to transmit the target image to the target bottom-layer processing module to be processed based on the given transmission protocol.

Figure 11:
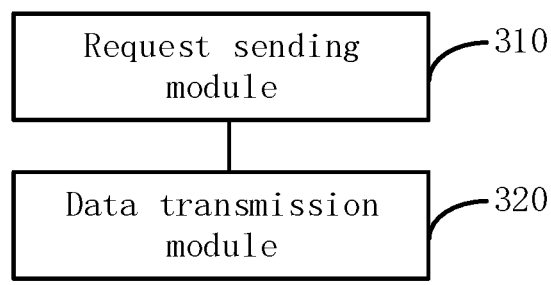
FIG. 11 is a block diagram of an image processing apparatus shown according to an example of the present disclosure.

FIG. 11 is a block diagram of an image processing apparatus shown according to an example of the present disclosure. The apparatus of the example may be applied to an external module (such as a wireless camera module) connected into a terminal device. As shown in FIG. 11, the apparatus may include: a request sending module 310 and a data transmission module 320.

The request sending module 310 is configured to send request information used for transmitting target data to the terminal device based on a pre-established communication connection in response to collecting the target data, in which the communication connection is established based on a hardware specification of the external module.

The data transmission module 320 is configured to transmit the target data to the terminal device based on a transmission parameter in response to that the terminal device determines the transmission parameter of the target data based on the request information.

It can be known from the above description that through the apparatus of the example, by sending the request information used for transmitting the target data to the terminal device based on the pre-established communication connection in response to collecting the target data, and transmitting the target data to the terminal device based on the transmission parameter in response to that the terminal device determines the transmission parameter of the target data based on the request information, as the communication connection is established based on the hardware specification of the external module, channels of connecting camera modules of different specifications into the terminal device can be broadened, selection of a solution for connecting the camera module into the terminal device is broken through, besides, as the transmission parameter of the target data is determined based on the request information sent by the external module, better transmitting the target data can be realized, and thus the demand of a user for obtaining high-quality target data is met.

Figure 12:
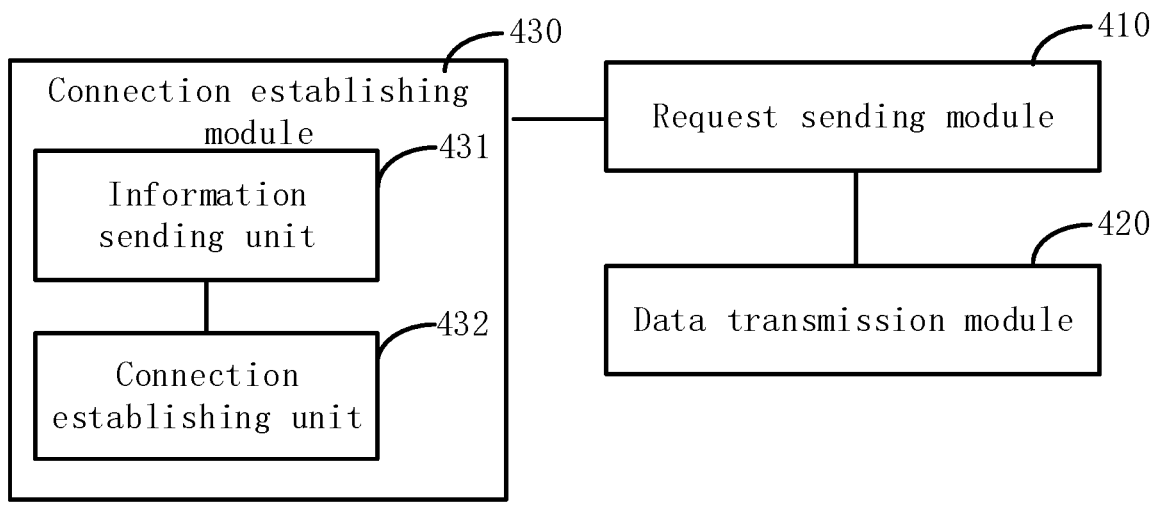
FIG. 12 is a block diagram of another image processing apparatus shown according to an example of the present disclosure.

FIG. 12 is a block diagram of another image processing apparatus shown according to an example of the present disclosure. The apparatus of the example may be applied to the external module (such as the wireless camera module) connected into the terminal device. The request sending module 410 and the data transmission module 420 are the same as functions of the above request sending module 310 and data transmission module 320 shown in FIG. 11, which will not be described in detail here. As shown in FIG. 12, the apparatus may further include a connection establishing module 430.

The connection establishing module 430 may include:
an information sending unit 431, configured to send to-be-verified information to the terminal device to be verified in response to receiving input of the to-be-verified information used for establishing the communication connection; and
a connection establishing unit 432, configured to establish the communication connection with the terminal device based on a configuration parameter of the terminal device in response to that the to-be-verified information passes verification of the terminal device, in which the configuration parameter of the terminal device is set based on the hardware specification of the external module.

In an example, the external module may include a camera module, and the target data may include a target image.

As for the apparatus in the above example, specific modes of executing operations of all the modules are already described in detail in the example related to the method and will not be set forth in detail here.

Figure 13:
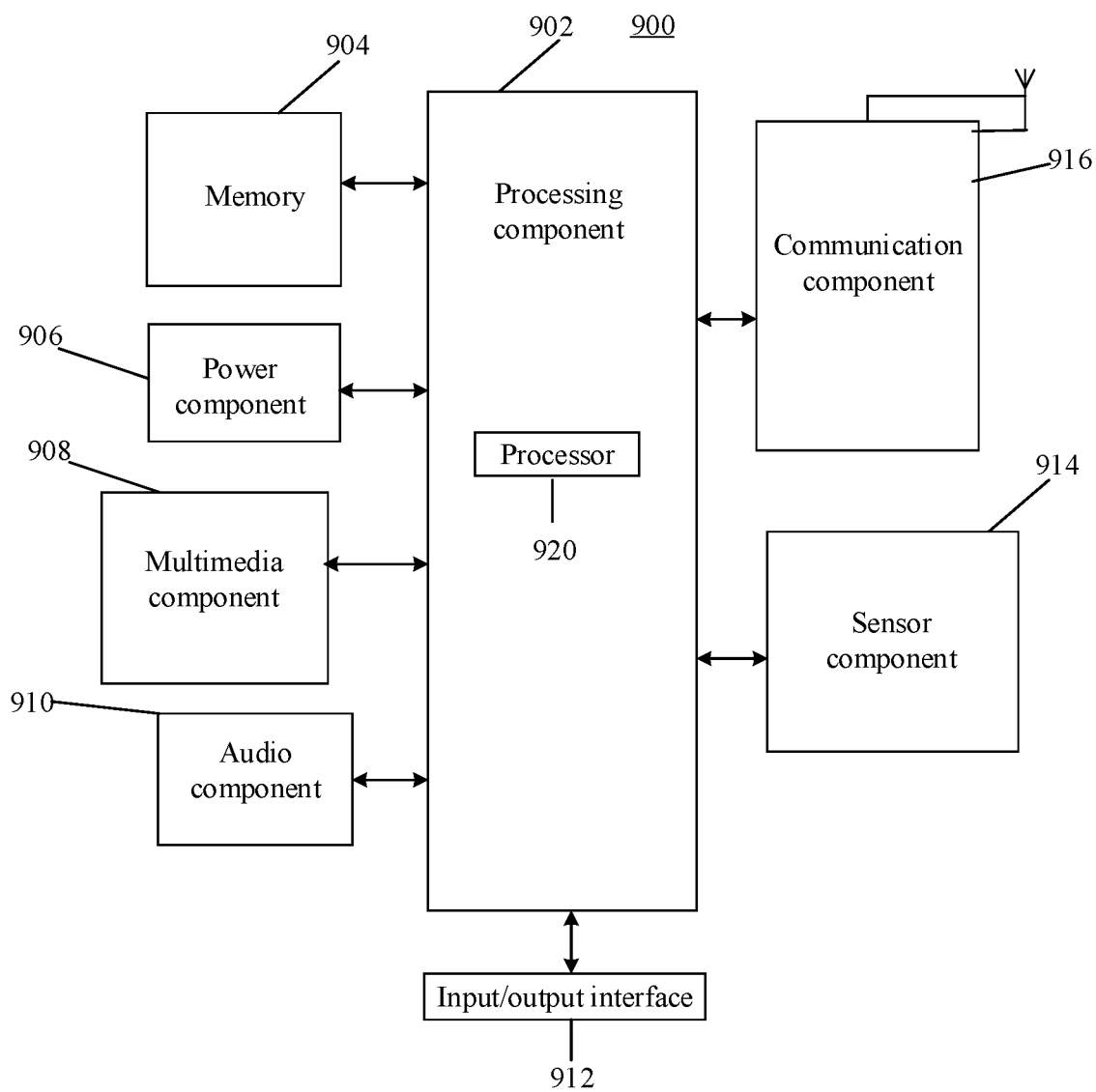
FIG. 13 is a block diagram of an electronic device shown according to an example of the present disclosure.

FIG. 13 is a block diagram of an electronic device shown according to an example. For example, a device 900 may be a mobile phone, a computer, a digital broadcast terminal, a messaging device, a game console, a tablet device, a medical device, a fitness facility, a personal digital assistant, etc.

Referring to FIG. 13, the device 900 may include one or more components as follows: a processing component 902, a memory 904, a power component 906, a multimedia component 908, an audio component 910, an input/output (I/O) interface 912, a sensor component 914 and a communication component 916.

The processing component 902 generally controls whole operation of the device 900, such as operations related to display, phone call, data communication, camera operation and recording operation. The processing component 902 may include one or more processors 920 for executing the instructions so as to complete all or part of steps of the above method. Besides, the processing component 902 may include one or more modules to facilitate interaction between the processing component 902 and the other components. For example, the processing component 902 may include a multimedia module so as to facilitate interaction between the multimedia component 908 and the processing component 902.

The memory 904 is configured to store various data so as to support operations on the device 900. Examples of these data include instructions of any application program or method for operation on the device 900, contact person data, telephone directory data, messages, pictures, videos and the like. The memory 904 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 906 provides power for the various components of the device 900. The power component 906 may include a power management system, one or more power sources, and other components related to power generation, management and distribution for the device 900.

The multimedia component 908 includes a screen which provides an output interface between the device 900 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 908 includes a front camera and/or a back camera. When the device 900 is in an operation mode, such as a photographing mode or a video mode, the front camera and/or the back camera can receive external multimedia data. Each front camera and each back camera may be a fixed optical lens system or have a focal length and an optical zoom capability.

The audio component 910 is configured to output and/or input an audio signal. For example, the audio component 910 includes a microphone (MIC). When the device 900 is in the operation mode, such as a call mode, a recording mode and a voice recognition mode, the microphone is configured to receive an external audio signal. The received audio signal may be further stored in the memory 904 or sent via the communication component 916. In some examples, the audio component 910 further includes a speaker for outputting the audio signal.

The I/O interface 912 provides an interface between the processing component 902 and a peripheral interface module, and the peripheral interface module may be a keyboard, a click wheel, buttons and the like. These buttons may include but are not limited to: a home button, a volume button, a start button and a lock button.

The sensor component 914 includes one or more sensors, configured to provide state evaluation of various aspects for the device 900. For example, the sensor component 914 can detect a start/shut-down state of the device 900 and relative positioning of the components, for example, the components are a display and a keypad of the device 900. The sensor component 914 can further detect position change of the device 900 or one component of the device 900, whether there is contact between the user and the device 900, and azimuth or speeding up/speeding down and temperature change of the device 900. The sensor component 914 may further include a proximity sensor, configured to detect existence of a nearby object without any physical contact. The sensor component 914 may further include an optical sensor, such as a CMOS or CCD image sensor, for use in imaging application. In some examples, the sensor component 914 may further include an acceleration sensor, a gyroscope sensor, a magnetic sensor, a pressure sensor or a temperature sensor.

The communication component 916 is configured to facilitate wired or wireless communication between the device 900 and the other devices. The device 900 may be accessed to a wireless network based on a communication standard, such as WiFi, 2G or 3G, 4G or 5G, or their combination. In an example, the communication component 916 receives a broadcast signal or related broadcast information from an external broadcast management system via a broadcast channel. In an example, the communication component 916 further includes a near-field communication (NFC) module so as to facilitate short-range communication. For example, the NFC module may be realized based on a radio frequency identification (RFID) technology, an infra-red data association (IrDA) technology, an ultra wide band (UWB) technology, a Bluetooth (BT) technology and other technologies.

In an example, the device 900 may be realized by one or more than one application specific integrated circuit (ASIC), digital signal processor (DSP), digital signal processing device (DSPD), programmable logic device (PLD), field-programmable gate array (FPGA), controller, microcontroller, microprocessor or other electronic component for executing the above method.

In an example, a non-transitory computer-readable storage medium including instructions is further provided, such as a memory 904 including the instructions. The instructions may be executed by a processor 920 of a device 900 so as to complete the above method. For example, the non-transitory computer-readable storage medium may be an ROM, a random access memory (RAM), a CD-ROM, a magnetic tape, a floppy disk, an optical data storage device and the like.

Those skilled in the art will easily figure out other implementation solutions of the present disclosure after considering the specification and practicing the disclosure disclosed herein. The present disclosure intends to cover any transformation, application or adaptive change of the present disclosure which conforms to a general principle of the present disclosure and includes common general knowledge or conventional technical means which are not disclosed by the present disclosure in the technical field. The specification and the examples are merely regarded as exemplary, the true scope and spirit of the present disclosure are indicated by the following claims.

It should be understood that the present disclosure is not limited to an accurate structure described above and shown in the accompanying drawings, and various modifications and changes can be made without departing from the scope of the present disclosure. The scope of the present disclosure is limited merely by appended claims.

According to a first aspect of examples of the present disclosure, a data processing method is provided and performed by a terminal device into which an external module is connected. The method includes:
 receiving request information used for transmitting target data and sent by the external module based on a pre-established communication connection, in which the communication connection is established based on a hardware specification of the external module;
 determining a transmission parameter of the target data based on the request information; and
 receiving the target data transmitted by the external module based on the transmission parameter.

In an example, receiving the target data transmitted by the external module based on the transmission parameter includes:
 receiving at least one data packet of the target data transmitted by the external module based on the transmission parameter; and
 determining the target data based on the at least one data packet.

In an example, the method further includes pre-establishing the communication connection based on the following modes:
 setting a configuration parameter of the terminal device based on the hardware specification of the external module in response to receiving an instruction used for configuring the external module;
 verifying to-be-verified information in response to receiving the to-be-verified information sent by the external module; and
 establishing the communication connection with the external module based on the configuration parameter in response to that the to-be-verified information passes verification.

In an example, determining the target data based on the at least one data packet includes:
 extracting data from the at least one data packet respectively in response to detecting that the at least one data packet meets a given requirement; and
 generating the target data based on the data.

In an example, where detecting that the at least one data packet meets the given requirement includes at least one of:
 determining that there is no loss of data of the at least one data packet;
 determining that there is no damage to the data of the at least one data packet.

In an example, the method further includes:
 sending a data repeat request to the external module in response to detecting that the at least one data packet does not meet the given requirement, in which the data repeat request is used for requesting the external module to resend the target data.

In an example, the method further includes:
 executing an operation corresponding to a control instruction in response to receiving the control instruction in a process of receiving the target data, in which the operation includes at least one of:
 interrupting transmission of the target data, pausing transmission of the target data and ending transmission of the target data.

In an example, the external module includes a camera module, and the target data include a target image.

In an example, the method further includes:
 transmitting the received target image to a bottom-layer processing module to be processed based on a given transmission protocol, in which the given transmission protocol includes a User Datagram Protocol (UDP) transmission protocol or a Transmission Control Protocol (TCP) protocol.

In an example, the request information further includes processing demand information of the target image; and
 transmitting the received target image to the bottom-layer processing module to be processed based on the given transmission protocol includes:
 determining a target bottom-layer processing module matching the processing demand information; and
 transmitting the target image to the target bottom-layer processing module to be processed based on the given transmission protocol.

According to a second aspect of examples of the present disclosure, a data processing method is provided and performed by an external module connected into a terminal device and includes:
 sending request information used for transmitting target data to the terminal device based on a pre-established communication connection in response to collecting the target data, in which the communication connection is established based on a hardware specification of the external module; and transmitting the target data to the terminal device based on a transmission parameter in response to that the terminal device determines the transmission parameter of the target data based on the request information.

In an example, the method further includes pre-establishing the communication connection based on the following modes:

sending to-be-verified information to the terminal device to be verified in response to receiving input of the to-be-verified information used for establishing the communication connection;

establishing the communication connection with the terminal device based on a configuration parameter of the terminal device in response to that the to-be-verified information passes verification of the terminal device, in which the configuration parameter of the terminal device is set based on the hardware specification of the external module.

In an example, the external module includes a camera module, and the target data include a target image.

According to a third aspect of examples of the present disclosure, a data processing apparatus is provided and applied to a terminal device into which an external module is connected and includes:

a request receiving module, configured to receive request information used for transmitting target data and sent by the external module based on a pre-established communication connection, in which the communication connection is established based on a hardware specification of the external module;

a parameter determining module, configured to determine a transmission parameter of the target data based on the request information; and a data receiving module, configured to receive the target data transmitted by the external module based on the transmission parameter.

In an example, the data receiving module includes:

a data packet receiving unit, configured to receive at least one data packet of the target data transmitted by the external module based on the transmission parameter; and a data determining unit, configured to determine the target data based on the at least one data packet.

In an example, the apparatus further includes a connection establishing module, in which the connection establishing module includes:

a parameter setting unit, configured to set a configuration parameter of the terminal device based on the hardware specification of the external module in response to receiving an instruction used for configuring the external module;

an information verification unit, configured to verify to-be-verified information in response to receiving the to-be-verified information sent by the external module; and a connection establishing unit, configured to establish the communication connection with the external module based on the configuration parameter in response to that the to-be-verified information passes verification.

In an example, the data determining unit is further configured to:

extract data from the at least one data packet respectively in response to detecting that the at least one data packet meets a given requirement; and generate the target data based on the data.

In an example, the at least one data packet meeting the given requirement includes at least one of:

there is no loss of data of the at least one data packet;

there is no damage to the data of the at least one data packet.

In an example, the data determining unit is further configured to:

send a data repeat request to the external module in response to detecting that the at least one data packet does not meet the given requirement, in which the data repeat request is used for requesting the external module to resend the target data.

In an example, the apparatus further includes:

an operation executing module, configured to execute an operation corresponding to a control instruction in response to receiving the control instruction in a process of receiving the target data, in which the operation includes at least one of:

interrupting transmission of the target data, pausing transmission of the target data or ending transmission of the target data.

In an example, the external module includes a camera module, and the target data include a target image.

In an example, the apparatus further includes:

an image transmission module, configured to transmit the received target image to a bottom-layer processing module to be processed based on a given transmission protocol, in which the given transmission protocol includes a User Datagram Protocol (UDP) transmission protocol or a Transmission Control Protocol (TCP) protocol.

In an example, the request information further includes processing demand information of the target image; and the image transmission module includes:

a module determining unit, configured to determine a target bottom-layer processing module matching the processing demand information; and an image transmission unit, configured to transmit the target image to the target bottom-layer processing module to be processed based on the given transmission protocol.

According to a fourth aspect of examples of the present disclosure, a data processing apparatus is provided and applied to an external module connected into a terminal device and includes:

a request sending module, configured to send request information used for transmitting target data to the terminal device based on a pre-established communication connection in response to collecting the target data, in which the communication connection is established based on a hardware specification of the external module; and a data transmission module, configured to transmit the target data to the terminal device based on a transmission parameter in response to that the terminal device determines the transmission parameter of the target data based on the request information.

In an example, the apparatus further includes a connection establishing module, in which the connection establishing module includes:

an information sending unit, configured to send to-be-verified information to the terminal device to be verified in response to receiving input of the to-be-verified information used for establishing the communication connection; and a connection establishing unit, configured to establish the communication connection with the terminal device based on a configuration parameter of the terminal device in response to that the to-be-verified information passes verification of the terminal device, in which the configuration parameter of the terminal device is set based on the hardware specification of the external module.

In an example, the external module includes a camera module, and the target data include a target image.

According to a fifth aspect of examples of the present disclosure, an electronic device is provided and includes:

a processor and a memory configured to store a computer program, in which the processor is configured to, when executing the computer program, implement:

receiving request information used for transmitting target data and sent by an external module based on a pre-established communication connection, in which the communication connection is established based on a hardware specification of the external module;

determining a transmission parameter of the target data based on the request information; and receiving the target data transmitted by the external module based on the transmission parameter.

According to a sixth aspect of examples of the present disclosure, a non-transitory computer-readable storage medium is provided and stores a computer program, in which the program, when executed by a processor, implements:

receiving request information used for transmitting target data and sent by an external module based on a pre-established communication connection, in which the communication connection is established based on a hardware specification of the external module;

determining a transmission parameter of the target data based on the request information; and receiving the target data transmitted by the external module based on the transmission parameter.

The technical solutions provided by the examples of the present disclosure can include the following beneficial effects:

in the present disclosure, by receiving the request information used for transmitting the target data and sent by the external module based on the pre-established communication connection, determining the transmission parameter of the target data based on the request information, and then receiving the target data transmitted by the external module based on the transmission parameter, as the communication connection is established based on the hardware specification of the external module, channels of connecting camera modules of different specifications into the terminal device can be broadened, selection of a solution for connecting the camera module into the terminal device is broken through, besides, as the transmission parameter of the target data is determined based on the request information sent by the external module, better transmitting the target data can be realized, and thus the demand of a user for obtaining high-quality target data is met.

The invention claimed is:

1. A data processing method, performed by a terminal device into which an external module is connected and comprising:

receiving request information used for transmitting target data and sent by the external module based on a pre-established communication connection, wherein the pre-established communication connection is established based on a hardware specification of the external module;

determining a transmission parameter of the target data based on the request information; and receiving the target data transmitted by the external module based on the transmission parameter;

the data processing method further comprising pre-establishing the communication connection based on the following modes:

setting a configuration parameter of the terminal device based on the hardware specification of the external module in response to receiving an instruction used for configuring the external module, wherein the configuration parameter comprises at least one type among a hardware interface type, a transmission protocol or an algorithm processing module;

verifying to-be-verified information in response to receiving the to-be-verified information sent by the external module; and establishing the communication connection with the external module based on the configuration parameter in response to that the to-be-verified information passes verification;

wherein the external module comprises a camera module, and the target data comprise a target image;

wherein the method further comprises:

transmitting a received target image to a bottom-layer processing based on a given transmission protocol;

wherein the request information further comprises processing demand information of the target image; and wherein transmitting the received target image to the bottom-layer processing based on the given transmission protocol comprises:

determining a target bottom-layer processing from among a plurality of bottom-layer processings, wherein the determining is based on the processing demand information; and transmitting the target image to the target bottom-layer processing based on the given transmission protocol.

2. The data processing method according to claim 1, wherein receiving the target data transmitted by the external module based on the transmission parameter comprises:

receiving at least one data packet of the target data transmitted by the external module based on the transmission parameter; and determining the target data based on the at least one data packet.

3. The data processing method according to claim 2, wherein determining the target data based on the at least one data packet comprises:

extracting data from the at least one data packet respectively in response to detecting that the at least one data packet meets a given requirement; and generating the target data based on the data.

4. The data processing method according to claim 3, wherein detecting that the at least one data packet meets the given requirement comprises:

determining that there is no loss of data of the at least one data packet.

5. The data processing method according to claim 3, wherein detecting that the at least one data packet meets the given requirement comprises:

determining that there is no damage to the data of the at least one data packet.

6. The data processing method according to claim 3, further comprising:

sending a data repeat request to the external module in response to detecting that the at least one data packet does not meet the given requirement, wherein the data repeat request is used for requesting the external module to resend the target data.

7. The data processing method according to claim 1, further comprising:
executing an operation corresponding to a control instruction in response to receiving the control instruction in a process of receiving the target data, wherein the operation comprises at least one of:
interrupting transmission of the target data, pausing transmission of the target data and ending transmission of the target data.

8. The data processing method according to claim 1, wherein the given transmission protocol comprises a User Datagram Protocol (UDP) transmission protocol or a Transmission Control Protocol (TCP) protocol.

9. A data processing method, performed by an external module connected into a terminal device and comprising:
sending request information used for transmitting target data to the terminal device based on a pre-established communication connection in response to collecting the target data, wherein the pre-established communication connection is established based on a hardware specification of the external module; and
transmitting the target data to the terminal device based on a transmission parameter in response to that the terminal device determines the transmission parameter of the target data based on the request information;
the data processing method further comprising pre-establishing the communication connection based on the following modes:
sending to-be-verified information to the terminal device to be verified in response to receiving input of the to-be-verified information used for establishing the communication connection; and
establishing the communication connection with the terminal device based on a configuration parameter of the terminal device in response to that the to-be-verified information passes verification of the terminal device, wherein the configuration parameter of the terminal device is set based on the hardware specification of the external module; wherein the configuration parameter comprises at least one type among a hardware interface type, a transmission protocol or an algorithm processing module;
wherein the external module comprises a camera module, and the target data comprise a target image;
wherein the request information further comprises processing demand information of the target image; and the processing demand information is used by the terminal device to determine a target bottom-layer processing from among a plurality of bottom-layer processings, wherein the determining is based on the processing demand information, and transmit the target image to the target bottom-layer processing based on the given transmission protocol.

10. The data processing method according to claim 9, wherein the external module comprises a camera module, and the target data comprise a target image.

11. An electronic device, comprising:
a processor and a memory configured to store a computer program, wherein the processor, when executing the computer program, is configured to:
receive request information used for transmitting target data and sent by an external module based on a pre-established communication connection, wherein the pre-established communication connection is established based on a hardware specification of the external module;
determine a transmission parameter of the target data based on the request information; and
receive the target data transmitted by the external module based on the transmission parameter;
wherein the processor is further configured to pre-establish the communication connection based on the following modes:
setting a configuration parameter of a terminal device based on the hardware specification of the external module in response to receiving an instruction used for configuring the external module, wherein the configuration parameter comprises at least one type among a hardware interface type, a transmission protocol or an algorithm processing module;
verifying to-be-verified information in response to receiving the to-be-verified information sent by the external module; and
establishing the communication connection with the external module based on the configuration parameter in response to that the to-be-verified information passes verification;
wherein the external module comprises a camera module, and the target data comprise a target image;
wherein the processor, when executing the computer program, is further configured to:
transmit a received target image to a bottom-layer processing based on a given transmission protocol;
wherein the request information further comprises processing demand information of the target image; and
wherein the processor, when executing the computer program, is further configured to:
determine target bottom-layer processing from among a plurality of bottom-layer processings, wherein the determining is based on the processing demand information; and
transmit the target image to the target bottom-layer processing based on the given transmission protocol.

12. The electronic device according to claim 11, wherein the processor is configured to:
receive at least one data packet of the target data transmitted by the external module based on the transmission parameter; and
determine the target data based on the at least one data packet.

13. The electronic device according to claim 12, wherein the processor is configured to:
extract data from the at least one data packet respectively in response to detecting that the at least one data packet meets a given requirement; and
generate the target data based on the data.

14. The electronic device according to claim 12, wherein the processor is configured to:
determining that there is no loss of data of the at least one data packet.

15. A non-transitory computer-readable storage medium, storing a computer program, wherein the computer program, when executed by a processor, implements the data processing method according to claim 1.

* * * * *